United States Patent [19]

Skoog

[11] 4,404,277
[45] Sep. 13, 1983

[54] DESENSITIZING DYES FOR PHOTOGRAPHIC EMULSIONS

[75] Inventor: Ivan H. Skoog, St. Paul, Minn.

[73] Assignee: Minnesota Mining and Manufacturing Company, St. Paul, Minn.

[21] Appl. No.: 295,015

[22] Filed: Aug. 21, 1981

[51] Int. Cl.³ .............................................. G03C 1/36
[52] U.S. Cl. .................................. 430/597; 430/593; 430/594
[58] Field of Search ....................... 430/597, 593, 594

[56] References Cited

U.S. PATENT DOCUMENTS

| | | | |
|---|---|---|---|
| 2,541,472 | 2/1951 | Kendall et al. | 430/597 |
| 3,431,111 | 4/1969 | Brooker et al. | 96/106 |
| 3,615,607 | 10/1971 | Soma et al. | 430/597 |
| 4,025,347 | 5/1977 | Beretta et al. | 96/101 |

Primary Examiner—Won H. Louie, Jr.
Attorney, Agent, or Firm—Cruzan Alexander; Donald M. Sell; Lorraine R. Sherman

[57] ABSTRACT

Novel cyanine dye salts having an alkoxyaryl function joined by a vinylene linkage to a heterocyclic nucleus are useful as desensitizers in fogged, direct positive type of silver halide emulsions.

13 Claims, No Drawings

DESENSITIZING DYES FOR PHOTOGRAPHIC EMULSIONS

TECHNICAL FIELD

This invention relates to a new class of cyanine dye salts and their use as desensitizers in direct positive photographic emulsions.

BACKGROUND ART

Cyanine dyes useful as desensitizers in a fogged, direct positive type of silver halide emulsion are known. U.S. Pat. No. 3,431,111 discloses certain cyanine dyes which contain an imidazo[4,5-b]quinoxaline nucleus. U.S. Pat. No. 4,025,347 discloses certain cyanine dyes containing an indole or indolenine nucleus carrying in the phenyl ring thereof a substituent of the benzoyl or phenyl-sulfonyl type.

DISCLOSURE OF THE INVENTION

The new class of cyanine dye salts of the present invention comprises compounds in which an alkoxyaryl function is joined by a vinylene (—CH=CH—) linkage to a heterocyclic nucleus. These dye salts, used in a chemically effective desensitizing amount, are useful as desensitizers in fogged, direct positive silver halide emulsions.

The desensitizing dyes of the present invention include compounds of the general formula

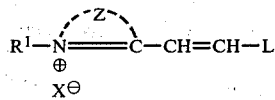

wherein
L represents a carbocyclic ligand, said ligand comprising a monocyclic nucleus of up to 6 carbon atoms, or polycyclic fused nuclei (i.e., wherein the nuclei share at least 2 common ring atoms) having at least one 6-membered ring, the cyclic carbon atoms of said ligand having up to 5 alkoxy substituents, each substituent having up to 4 carbon atoms,
Z represents a group of nonmetallic atoms required to complete a desensitizing heterocyclic nucleus containing five atoms in a heterocyclic ring which may contain a second hetero atom such as oxygen, sulfur, selenium, or nitrogen, and said ring is part of a fused ring system of up to 3 rings, which ring system may contain up to 4 hetero atoms, and with no individual ring having more than 6 ring atoms,
$R^1$ represents a phenylsulfonyl, hydrogen, alkyl of up to 4 carbon atoms, or a nitro group that occupies the 5-position in a double fused ring system or the 6-position in a triple fused ring system, and
$X^\ominus$ represents an acid anion.
Z includes heterocyclic ring systems based on thiazole or benzothiazole (e.g., 5-chlorobenzothiazole, 5-nitrobenzothiazole, 5-benzoylbenzothiazole); indolenine (e.g., 3,3-dimethyl-5-nitroindolenine, 3,3-dimethyl-5-phenylsulfonylindolenine, 3,3-dimethyl-5-benzoylindolenine); imidazo[4,5-b]quinoxaline (e.g., imidazo[4,5-b]quinoxaline, 6-methylimidazo[4,5-b]quinoxaline, 6,7-dimethylimidazo[4,5-b]quinoxaline, 6-nitroimidazo[4,5-b]quinoxaline, 6,7-dichloroimidazo[4,5-b]quinoxaline); imidazo[4,5-b]pyrido[2,3-b]pyrazine; and 3-ethylthiazolo[4,5-b]quinoline.

Preferably $X^\ominus$ is an anion such as chloride, bromide, iodide, p-toluenesulfonate, methylsulfate, ethyl sulfate, and perchlorate.

DETAILED DESCRIPTION

In one embodiment, the new class of cyanine dye salts of the present invention comprise compounds in which the alkoxyaryl function is joined through a vinylene linkage to the 2-position of an imidazoquinoxalino nucleus.

In a second embodiment of this invention, the alkoxyaryl function is joined through a vinylene linkage to the 2-position of a phenyl-sulfonyl indole nucleus.

In a third embodiment of this invention, the alkoxyaryl function is joined through a vinylene linkage to the 2-position of a benzothiazole nucleus.

Aryl as used herein refers to the monovalent phenyl radical ($C_6H_5$—) and the monovalent naphthyl radical ($C_{10}H_7$—). The phenyl function may be mono, di, tri, or tetraalkoxyl substituted and preferably it is a trimethoxy phenyl function. The alkoxy group is lower alkoxy containing up to four carbon atoms.

This invention, in addition to disclosure of this class of novel cyanine dye salts, relates to methods for preparing these new dyes and to photographic emulsions containing desensitizing amounts of these new dyes.

Briefly, the new dyes of the present invention include those represented by the following general formulae:

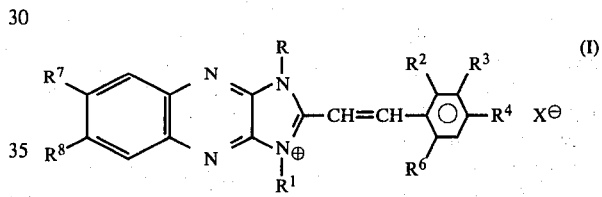

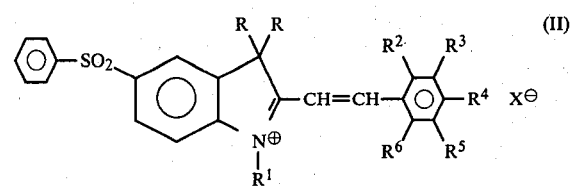

or

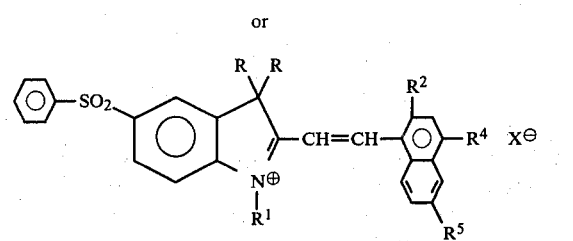

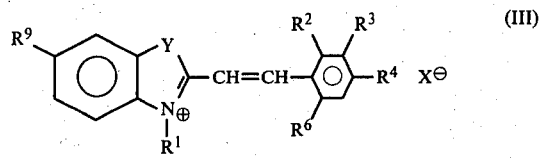

wherein:
R represents an alkyl group of 1 to 4 carbon atoms, and preferably it is a —$CH_3$ or —$C_2H_5$ group,
$R^1$ represents an alkyl group of 1 to 4 carbon atoms, and preferably it is a —$C_2H_5$ group,
$R^2$, $R^3$, and $R^4$ each independently represent a hydrogen atom or an alkoxy group of up to 4 carbon atoms which preferably is a —OCH₃ or —OC₂H₅ group, R⁵ and R⁶ each independently represent a hydrogen atom or an alkoxy group of up to 4 carbon atoms which preferably is a —OCH₃ group, or R⁵ and R⁶ may be the substituents necessary to form a fused benzene ring which may itself be further substituted by an alkoxy group of up to 4 carbon atoms, which preferably is a —OCH₃ group, with the proviso that at least one of R², R³, R⁴, R⁵, and R⁶ is selected from alkoxy groups, which preferably is a —OCH₃ or —OC₂H₅ group, R⁷ and R⁸ each independently represent a hydrogen atom or an alkyl group of up to 4 carbon atoms which preferably is a —CH₃ group, R⁹ represents a —NO₂ group, Y represents a N, or S atom, and preferably is a S atom, and X represents an acid anion, for instance chloride, bromide, iodide, sulfonate, perchlorate, p-toluenesulfonate, methylsulfate, etc., and preferably is an iodide or p-toluene-sulfonate group.

The cyanine dyes of the present invention may all be prepared by aldehyde condensation with the quaternary salt of the appropriate imidazoquinoxaline, phenylsulfonylindole, or benzothiazole compound. The appropriate aldehyde is heated with an active methylene group-containing compound in acetic anhydride for several hours. The desired product is separated by filtration.

The present invention provides direct positive photographic silver halide emulsions which, as is known in the art, are prepared by incorporating one or more of the cyanine dyes of the invention into a suitable fogged silver halide emulsion. The emulsion can be fogged in any appropriate manner, such as by light or with chemical fogging agents, e.g., stannous chloride, formaldehyde, or thiourea dioxide. The emulsion may be fogged by the addition thereto of a reducing agent, such as thiourea dioxide, and a compound of a metal more electropositive than silver, such as a gold salt. Examples include potassium chloraurate, auric chloride, and (NH₄)₂PdCl₆.

Useful concentrations of reducing agent and metal compound can be varied over a considerable range. Good results are obtained using about 0.05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 100 to 1000 mg. and preferably from about 250 to 500 mg. per mole of silver halide in the direct positive emulsions.

In the preparation of the above photographic emulsions, the dyes of the invention are advantageously incorporated in the washed, finished silver halide emulsion and should be uniformly distributed throughout the emulsion. The methods of incorporating dyes and other addenda in emulsions are well known to those skilled in the art of emulsion making. For example, it is convenient to add them from solutions in appropriate solvents; the solvent selected should be completely free from any deleterious effect on the ultimate light-sensitive materials. Satisfactory solvents for this purpose include methanol, isopropanol, pyridine, and water, alone or in admixtures. The type of silver halide emulsions that can be sensitized with the new dyes include any of those prepared with hydrophilic colloids that are known to be useful for dispersing silver halides, for example, emulsions comprising natural materials such as gelatin, albumin, gum arabic, and hydrophilic synthetic resins such as polyvinyl alcohol and polyvinyl pyrrolidone.

The binding agents for the emulsion layer of the photographic element can also contain dispersed polymerized vinyl compounds such as water insoluble polymers of alkyl acrylates and methacrylates, acrylic acid, sulfoalkyl acrylates or methacrylates.

The dyes, reducing agents and metal compounds of the invention can be used with emulsions prepared with any of the light-sensitive silver halide salts including silver chloride, silver bromide, silver chlorobromide, silver bromoiodide, silver chlorobromoiodide, etc.

The novel emulsions of this invention may be coated on any suitable photographic support, such as glass, polymeric films such as cellulose acetate, polystyrenes, polyesters such as poly(ethylene terephthalate), paper and coated paper.

The compounds of the present invention provide new and improved light sensitive photographic emulsions, such as fogged, direct, positive emulsions typically used in graphic arts films and color photographic films.

Objects and advantages of this invention are further illustrated by the following examples, but the particular materials and amounts thereof recited in these examples, as well as other conditions and details, should not be construed to unduly limit this invention.

EXAMPLE 1

1,3-diethyl-2-[(2',4',6'-trimethoxyphenyl)vinyl-]imidazo[4,5-b]quinoxalinium-p-toluenesulfonate

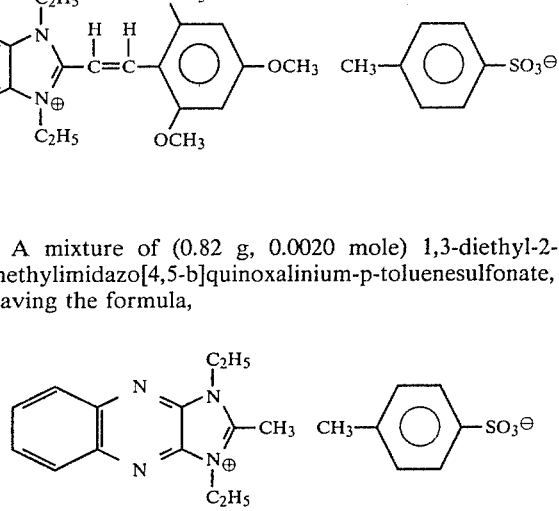

A mixture of (0.82 g, 0.0020 mole) 1,3-diethyl-2-methylimidazo[4,5-b]quinoxalinium-p-toluenesulfonate, having the formula,

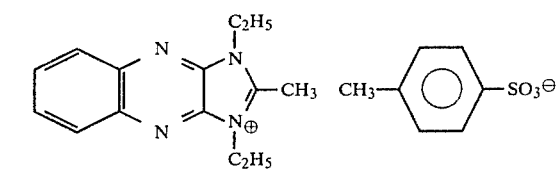

prepared as described in U.S. Pat. No. 3,431,111 or U.S. Pat. No. 3,632,808, and 2,4,6-trimethoxybenzaldehyde (0.40 g, 0.0020 mole) was boiled in 1.5 ml acetic anhydride for 10 min. Upon cooling the red solution gave a yellow precipitate which was collected and then washed with ethyl acetate and ether to give 0.63 g of product, m.p. 241°-242° C. Spectral analysis confirmed the product to be 1,3-diethyl-2-[(2',4',6'-trimethoxyphenyl)vinyl]imidazo[4,5-b]quinoxalinium-p-toluenesulfonate.

EXAMPLE 2

1,3-diethyl-6,7-dimethyl-2-[(2',4',6'-trimethoxyphenyl)vinyl]imidazo[4,5-b]quinoxalinium-p-toluenesulfonate

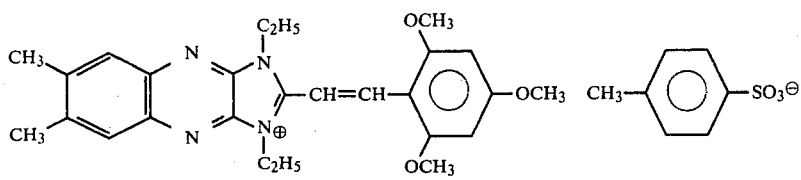

Using the same general methods as in Example 1, except that 1,3-diethyl-2,6,7-trimethylimidazo[4,5-b]quinoxalinium-p-toluenesulfonate, prepared by the method described in U.S. Pat. No. 3,431,111, and 2,4,6-trimethoxybenzaldehyde were used as starting materials and ethyl acetate was added to precipitate the product from the reaction mixture, m.p. 235°-236° C. Spectral analysis confirmed the compound to be 1,3-diethyl-6,7-dimethyl-2-[(2',4',6'-trimethoxyphenyl)vinyl]imidazo[4,5-b]quinoxalinium-p-toluenesulfonate.

EXAMPLE 3

1-ethyl-3,3-dimethyl-5-phenylsulfonyl-2-[(2',4',6'-trimethoxyphenyl)vinyl]indoleninium iodide

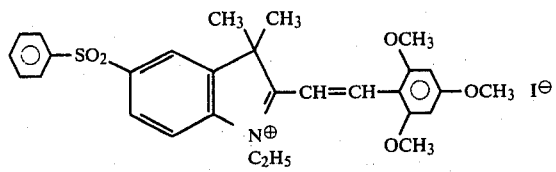

Using the same general method as in Example 2, except that 1-ethyl-2,3,3-trimethyl-5-phenylsulfonylindoleninium iodide, prepared as disclosed in Example 22 of U.S. Pat. No. 4,025,347, was used as a starting material, a solid compound (m.p. 178°-180° C.) was collected from the reaction mixture. Spectral analysis confirmed the compound to be 1-ethyl-3,3-dimethyl-5-phenylsulfonyl-2-[(2',4',6'-trimethoxyphenyl)vinyl]indoleninium iodide.

EXAMPLE 4

1-ethyl-5-nitro-2-[(2',4',6'-trimethoxyphenyl)vinyl]benzothiazolium iodide

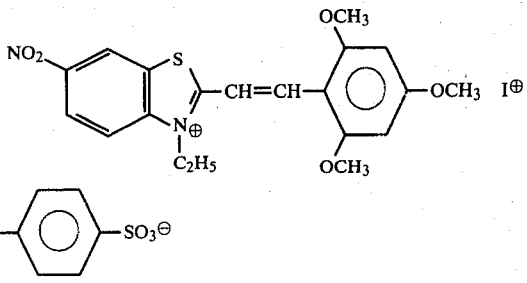

Using the same general method as in Example 1, except that 1-ethyl-2-methyl-5-nitrobenzothiazolium iodide,

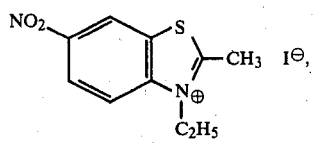

prepared as described in J. Am. Chem. Soc., 64, 207 (1942), was used as starting materials, a solid compound (m.p. 271°-272° C.) was collected from the mixture. Spectral analysis confirmed the compound to be 1-ethyl-5-nitro-2-[(2',4',6'-trimethoxyphenyl)vinyl]benzothiazolium iodide.

EXAMPLE 5

In a similar manner as in Examples 1 and 2, the sample compounds of Table I were prepared. Spectral analysis was used to confirm the structures.

The mono, di, and trimethoxybenzaldehydes and methoxynaphthaldehydes were all obtained from Aldrich Chemical Co.

The 2,3,4,6-tetramethoxybenzaldehyde was prepared from tetramethoxybenzene as described in J. Chem. Soc., 1974, 1353.

Tetramethoxybenzene was prepared as described in J. Chem. Soc., 1941, 665.

The 2,4,5-triethoxybenzaldehyde was obtained from the Alfred Bader Library of Rare Chemicals, Aldrich Chemical Co.

The 2,4,6-triethoxybenzaldehyde was obtained from the Chemicals Procurement Laboratories.

TABLE I

| SAMPLE NO. | STRUCTURE | NAME | M.P. |
|---|---|---|---|
| 5 | | 1,3-diethyl-2-[(2',3',4',6'-tetramethoxyphenyl)vinyl]imidazo-[4,5-b]quinoxalinium-p-toluenesulfonate | 204–206° C. |

TABLE I-continued

| SAMPLE NO. | STRUCTURE | NAME | M.P. |
|---|---|---|---|
| 6 | | 1-ethyl-3,3-dimethyl-5-phenyl-sulfonyl-2-[(2',3',4',6'-tetramethoxyphenyl)vinyl]indoleninium iodide | 195° C. |
| 7 | | 1-ethyl-5-nitro-2-[(2',3',4',6'-tetramethoxyphenyl)vinyl]-benzothiazolium iodide | 231–233° C. |
| 8 | | 1-ethyl-3,3,-dimethyl-4-phenyl-sulfonyl-2-[(2',4'-dimethoxyphenyl)vinyl]indoleninium iodide | 232–234° C. |
| 9 | | 1-ethyl-3,3-dimethyl-5-phenyl-sulfonyl-2-[(2',5'-dimethoxyphenyl)vinyl]indoleninium iodide | 191–192° C. |
| 10 | | 1-ethyl-3,3-dimethyl-5-phenyl-sulfonyl-2-[(4'-methoxy-1'-naphthyl)vinyl]indoleninium iodide | 165–168° C. |
| 11 | | 1-ethyl-3,3-dimethyl-5-phenyl-sufonyl-2-[(2'-methoxy-1'-naphthyl)vinyl]indoleninium iodide | 207–208° C. |
| 12 | | 1,3-diethyl-2-[(2',4',5'-trimethoxyphenyl)vinyl]imidazo[4,5-b]quinoxalinium-p-toluenesulfonate | 205–206° C. |
| 13 | | 1-ethyl-3,3-dimethyl-5-phenyl-sulfonyl-2-[(2',4',5'-trimethoxyphenyl)vinyl]indoleninium iodide | 158–160° C. |

TABLE I-continued

| SAMPLE NO. | STRUCTURE | NAME | M.P. |
|---|---|---|---|
| 14 | (structure) | 1,3-diethyl-2-[(2',4',5'-triethoxyphenyl)vinyl]imidazo[4,5-b]-quinoxalinium-p-toluenesulfonate | 189–191° C. |
| 15 | (structure) | 1-ethyl-3.3-dimethyl-5-phenyl-sulfonyl-2-[(2',4',5'-triethoxyphenyl)vinyl]indoleninium iodide | 230–231° C. |
| 16 | (structure) | 1,3-diethyl-2-[(2',4',6'-triethoxyphenyl)vinyl]imidazo[4,5-b]-quinoxalinium-p-toluenesulfonate | 215–217° C. |
| 17 | (structure) | 1-ethyl-3,3-dimethyl-5-phenyl-sulfonyl-2-[(2',4',6'-triethoxyphwnyl)vinyl]indoleninium iodide | 230–231° C. |
| 18 | (structure) | 1,3-diethyl-2-(phenylvinyl)-imidazo[4,5-b]quinoxalinium-p-toluenesulfonate | 224° C. |
| 19 | (structure) | 1-ethyl-3,3-dimethyl-5-phenyl-sulfonyl-2-(phenylvinyl)-indoleninium iodide | 170–171° C. |

EXAMPLE 6

Coating and emulsion testing data

A monodisperse cubic Ag(I)Br emulsion containing 3% iodide was prepared by the balanced double jet precipitation technique, maintaining a pAg of 3.5. After completion of physical ripening the emulsion was coagulated with acetic anhydride and the excess halide salts were removed by decanting. The washed emulsion was redispersed in gelatin; the pH was adjusted to 8 and the pAg to 8. The emulsion was fogged by adding formamidinesulfinic acid and gold chloride stabilized with hydrochloric acid. After digesting at 60° C. for 1 hour the emulsion was cooled to 35° C. and a coating aid such as Alkanol B was added. This emulsion was split into portions, the dye solutions were added at a level of 500 mg dye per mole of silver, and the emulsion was coated on polyester photographic base by methods well known in the art. The coatings were exposed in a sensitometer (Eastman Kodak, Model 101) using a 0.2 density wedge, 40 sec. exposure, with a 0.7 neutral density filter and processed in a lith developer (RAP 20 processor Log-Etronics) for 18 seconds.

The processed film showed the following sensitometric responses. The sample compounds used are in Table I above. Coating and emulsion testing data are in Table II.

TABLE II

| SAMPLE | Speed at 0.2 optical density over $D_{min}$, log e units | $D_{max}$ |
|---|---|---|
| 18 | −1.33 | 4.70 |
| 16 | −0.67 | 3.85 |
| 14 | −1.04 | 4.75 |
| 19 | −2.12 | 4.86 |
| 17 | −0.77 | 3.75 |
| 15 | −1.14 | 4.64 |
| 13 | −1.16 | 4.52 |

The table shows that great speed increases are obtained with the compounds containing —OR groups and particularly with tri-alkoxy substitution in the 2,4,6 positions.

Various modifications and alterations of this invention will become apparent to those skilled in the art without departing from the scope and spirit of this invention, and it should be understood that this invention is not to be unduly limited to the illustrative embodiments set forth herein.

What we claim is:

1. A light-sensitive, fogged, direct positive silver halide emulsion characterized by having therein a desensitizing amount of cyanine dye corresponding to the following formula:

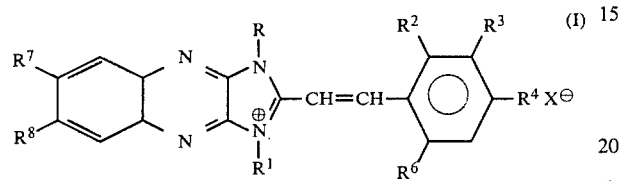

wherein:

R represents an alkyl group of up to 4 carbon atoms, $R^1$ represents an alkyl group of 1 to 4 carbon atoms, $R^2$, $R^3$, and $R^4$ each independently represent a hydrogen atom or an alkoxy group of up to 4 carbon atoms, $R^6$ represents a hydrogen atom or an alkoxy group of up to 4 carbon atoms, with the proviso that at least one of $R^2$, $R^3$, $R^4$, and $R^6$ is selected from alkoxy groups, $R^7$ and $R^8$ each independently represent a hydrogen atom or an alkyl group of up to 4 carbon atoms, and X represents an acid anion, selected from chloride, bromide, iodide, sulfonate, perchlorate, p-toluenesulfonate, and methylsulfate.

2. A light-sensitive, fogged, direct positive silver halide emulsion characterized by having therein a desensitizing amount of cyanine dye corresponding to the following formulae:

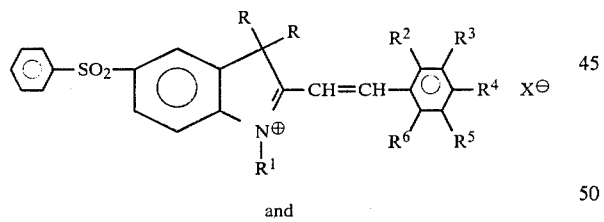

and

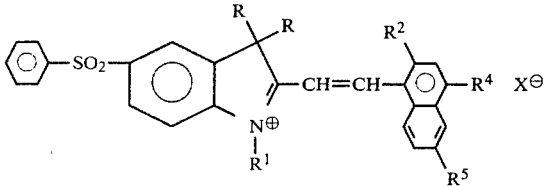

wherein:

R represents an alkyl group of up to 4 carbon atoms, $R^1$ represents an alkyl group of 1 to 4 carbon atoms, $R^2$, $R^3$, and $R^4$ each independently represent a hydrogen atom or an alkoxy group of up to 4 carbon atoms, $R^5$ and $R^6$ each independently represent a hydrogen atom or an alkoxy group of up to 4 carbon atoms, or $R^5$ and $R^6$ may be the substituents necessary to form a fused benzene ring which may itself be further substituted by an alkoxy group of up to 4 carbon atoms, with the proviso that at least two of $R^2$, $R^3$, $R^4$, $R^5$, and $R^6$ are selected from alkoxy groups, and X represents an acid anion, selected from chloride, bromide, iodide, sulfonate, perchlorate, p-toluenesulfonate, and methylsulfate.

3. Light-sensitive fogged, direct positive silver halide emulsions according to claim 1 wherein:

R represents a $-CH_3$ or $-C_2H_5$ group, $R^1$ represents a $-C_2H_5$ group, $R^2$, $R^3$, and $R^4$ each independently represent a hydrogen atom or an $-OCH_3$ group, $R^6$ represents a hydrogen atom or an $-OCH_3$ group, or $R^6$ may be the substituents necessary to form a fused benzene ring which may be further substituted by an $-OCH_3$ group, with the proviso that at least one of $R^2$, $R^3$, $R^4$, and $R^6$ is an $-OCH_3$ group, $R^7$ and $R^8$ each independently represent a hydrogen atom or a $-CH_3$ group, X represents $I^-$ or a

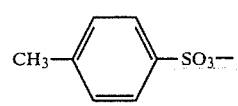

group.

4. Light-sensitive, fogged, direct positive silver halide emulsions according to claim 1 characterized in that they contain a desensitizing amount of

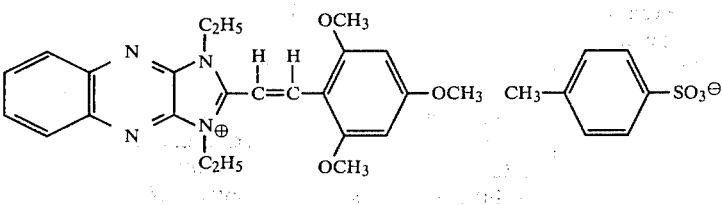

5. Light-sensitive, fogged, direct positive silver halide emulsions according to claim 1 characterized in that they contain a desensitizing amount of

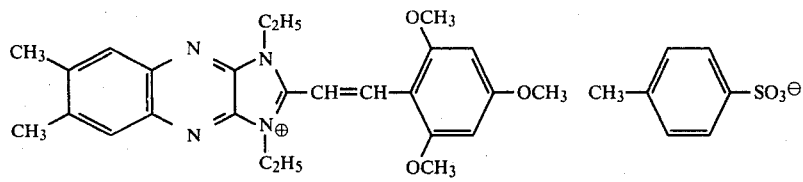

6. Light-sensitive, fogged, direct positive silver halide emulsions, according to claim 2 characterized in that they contain a desensitizing amount of

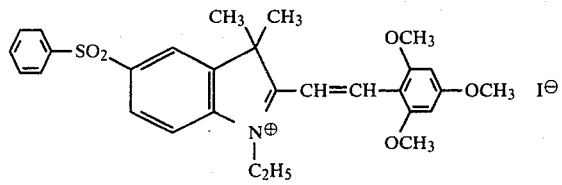

7. Light-sensitive, fogged, direct positive silver halide emulsions, according to claim 2 characterized in that they contain a desensitizing amount of

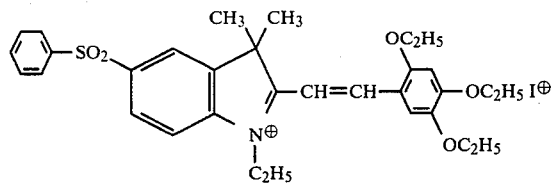

8. Light-sensitive, fogged, direct positive silver halide emulsions, according to claim 1 characterized in that they contain a desensitizing amount of 9. Light-sensitive, fogged, direct positive silver halide emulsions, according to claim 2 characterized in that they contain a desensitizing amount of

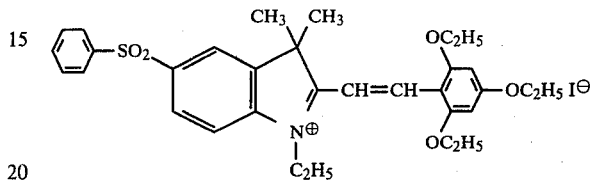

10. Direct positive photographic elements, characterized in that they contain at least one layer of light-sensitive emulsion as claimed in claim 1 or claim 2.

11. Light-sensitive, fogged, direct positive silver halide emulsions according to claim 1 or claim 2 wherein said cyanine dye is present in an amount in the range of 100 mg to 1500 mg of dye per mole of silver present.

12. Light-sensitive, fogged, direct positive silver halide emulsions according to claim 11 wherein said cyanine dye is present in an amount in the range of 250 mg to 500 mg of dye per mole of silver present.

13. The light-sensitive, fogged, direct positive silver halide emulsion according to claim 1 wherein at least two of $R^2$, $R^3$, $R^4$, and $R^6$ are selected from alkoxy groups.

* * * * *

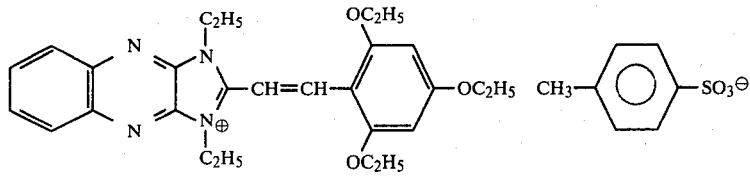

UNITED STATES PATENT AND TRADEMARK OFFICE
CERTIFICATE OF CORRECTION

PATENT NO. : 4,404,277

DATED : Sept. 13, 1983

INVENTOR(S) : Ivan H. Skoog

It is certified that error appears in the above-identified patent and that said Letters Patent is hereby corrected as shown below:

```
Column 8, TABLE I, Sample 8
Reads "1-ethyl-3,3,-dimethyl-4-phenyl-sulfonyl-2-[(2',4'-
dimethoxy-phenyl)vinyl]indoleninium iodide"
It should read --  1-ethyl-3,3,-dimethyl-5-phenyl-sulfonyl-2-
[(2',4'-dimethoxy-phenyl)vinyl]indoleninium iodide
--
```

UNITED STATES PATENT AND TRADEMARK OFFICE
CERTIFICATE OF CORRECTION

PATENT NO. : 4,404,277

DATED : Sept. 13, 1983

INVENTOR(S) : Ivan H. Skoog

It is certified that error appears in the above-identified patent and that said Letters Patent is hereby corrected as shown below:

Column 13, line 30 Reads

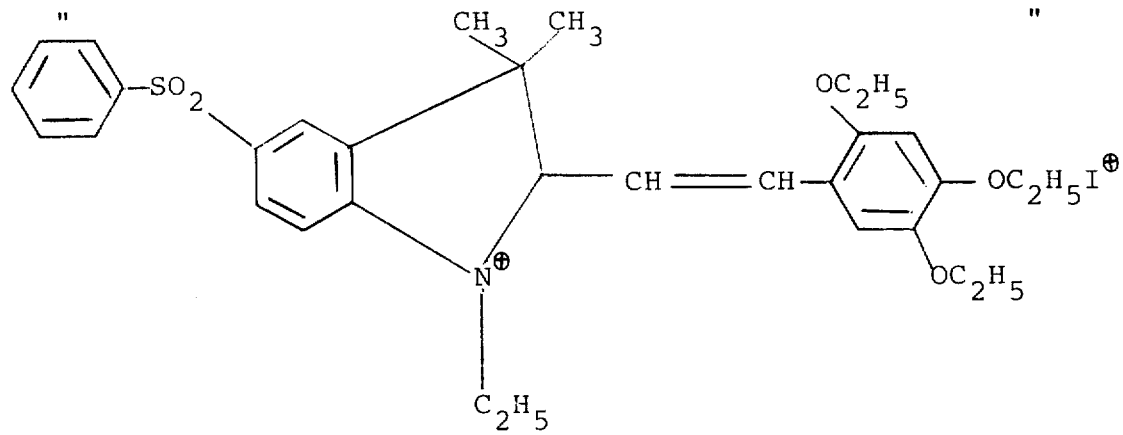

UNITED STATES PATENT AND TRADEMARK OFFICE
CERTIFICATE OF CORRECTION

| | | |
|---|---|---|
| PATENT NO. : | 4,404,277 | Page 3 of 3 |
| DATED : | Sept. 13, 1983 | |
| INVENTOR(S) : | Ivan H. Skoog | |

It is certified that error appears in the above-identified patent and that said Letters Patent is hereby corrected as shown below:

-- It should read

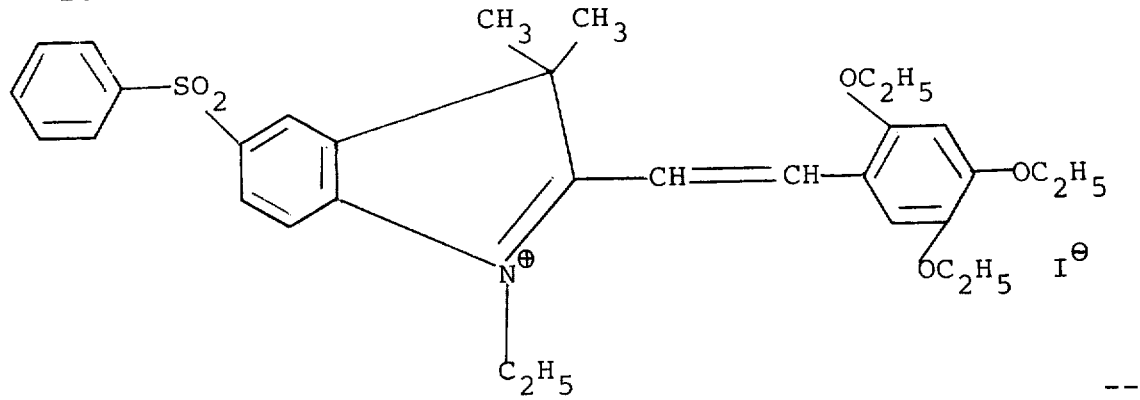

--

𝔖igned and 𝔖ealed this

Fourteenth Day of May 1985

[SEAL]

Attest:

DONALD J. QUIGG

Attesting Officer     Acting Commissioner of Patents and Trademarks